June 17, 1930.   E. F. MANTHEY   1,764,111
ELECTRICALLY DRIVEN SAW
Filed March 19, 1926   2 Sheets-Sheet 1
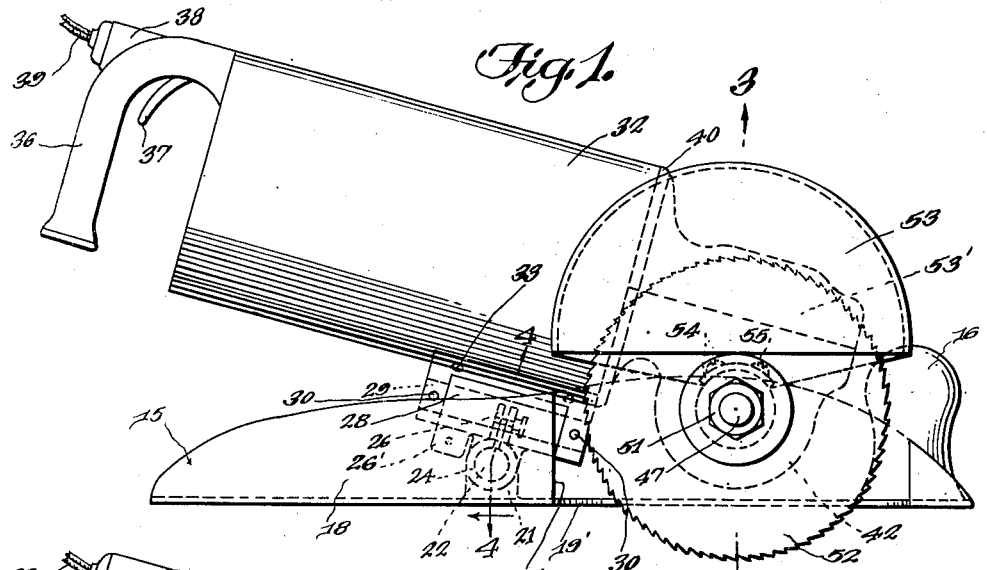
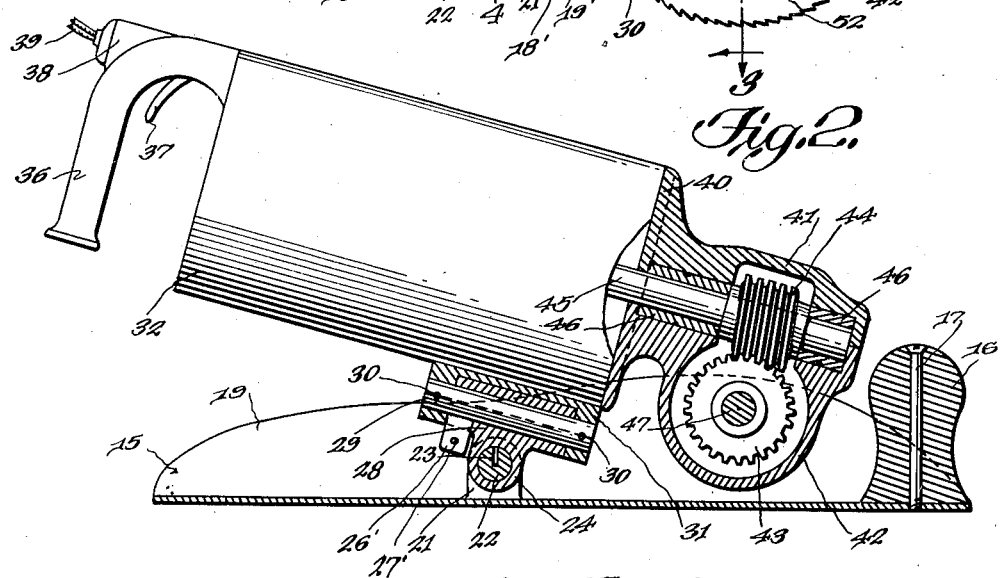

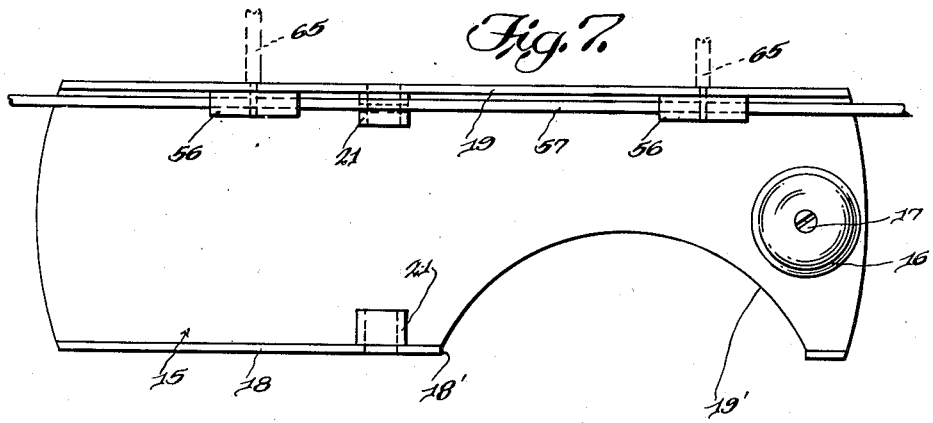
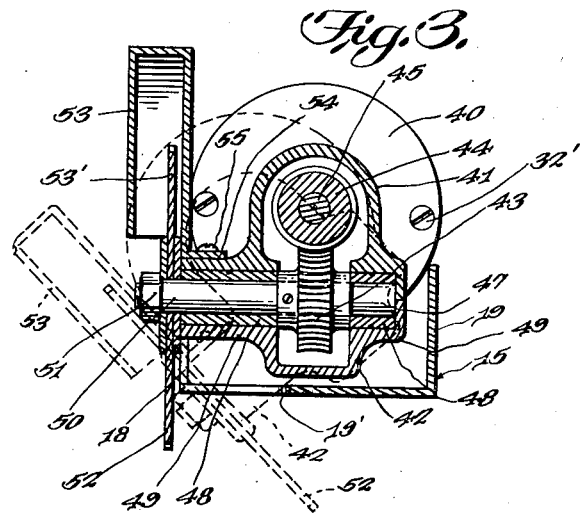
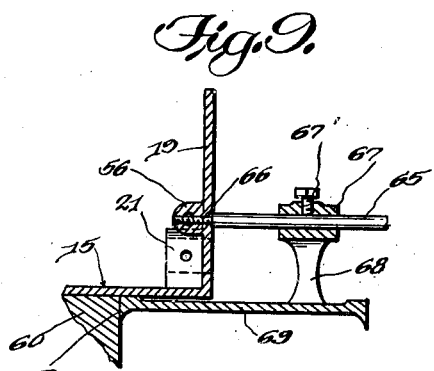
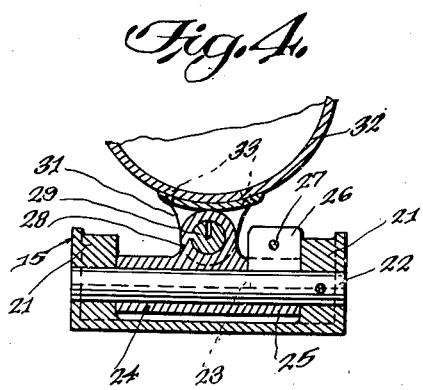
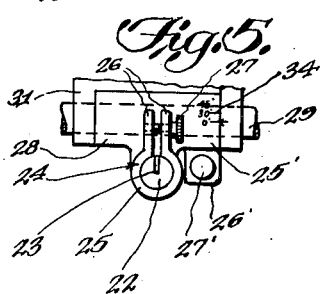

Patented June 17, 1930

1,764,111

UNITED STATES PATENT OFFICE

EDWARD F. MANTHEY, OF FENNVILLE, MICHIGAN, ASSIGNOR TO ALEX A. CLARKE, OF CHICAGO, ILLINOIS

ELECTRICALLY-DRIVEN SAW

Application filed March 19, 1926. Serial No. 95,964.

This invention relates to certain novel improvements in electrically driven saws and has for its principal object the provision of an improved construction of this character which will be highly efficient in use and economical in manufacture.

Among the several objects of the invention is the production of a device of this character wherein the saw blade can be expeditiously adjusted in various angular positions in cutting relation with respect to the work and wherein the saw blade is effectively guided during cutting operation upon the work.

A further object of the invention is the production of a device of this character wherein the saw blade can be adjusted in a vertical plane to vary the depth of cut to be made in the work.

Other objects will appear hereinafter.

The invention consists in the combination and arrangement of parts hereinafter described and claimed.

The invention will be best understood by reference to the accompanying drawings, illustrating the preferred form of construction, and in which, Fig. 1 is a side elevational view of the invention, Fig. 2 is a vertical sectional view of the same, Fig. 3 is a sectional detail view of the same taken substantially on 3—3 of Fig. 1, Fig. 4 is a fragmentary sectional detail view of the same taken substantially on line 4—4 of Fig. 1, Fig. 5 is a fragmentary detail view illustrating the method of mounting the saw blade for adjustment in various angular positions, Fig. 6 is a fragmentary plan view of certain bearing sleeves embodied in the invention illustrating the sleeves provided with graduation marks, Fig. 7 is a top plan view of a base plate embodied in the invention illustrating a modified form of construction, Fig. 8 is a fragmentary detail view illustrating a combination of elements for guiding the invention during rip sawing operation upon the work, and Fig. 9 is a fragmentary sectional detail view illustrating the combination of elements for gaging the width of the work to be cut out.

To accomplish the various objects of the invention I have, as illustrated in Figs. 1 and 2, provided a base plate 15 which is adapted to move over and into contact with the work to be operated upon. This base plate at its forward end portion carries a handle 16, secured thereto through the medium of a screw member 17, to facilitate operation of the base plate and to retain the base plate into contact with the work. This base plate 15 further includes side walls 18 and 19. This base plate 15 has a portion cut away to provide an arcuated recess 19' providing a clearance space for reasons hereinafter understood.

As illustrated in Fig. 2 the base plate 15 has formed thereon bearing lugs 21 adapted to support a pintle 22 having a longitudinally extending slit 23 formed therein to increase the yielding properties thereof when this pintle is clampingly engaged by a bearing sleeve 24.

The clamping relation between the bearing sleeve 24 and the pintle 22 is effected through the medium of a clamping ring 25 formed as an integral part of this bearing sleeve and including opposite ears 26 clampingly secured together through the medium of a finger screw 27.

As best illustrated in Fig. 5 this bearing sleeve is formed as an integral part of a bearing sleeve 28. This bearing sleeve 28 extends substantially at right angles with respect to the bearing sleeve 24 and is adapted to rotatably support a pintle 29. This pintle 29 has its opposite end portions keyed as at 30 to a bearing sleeve 31 carried by and secured to a housing 32 as at 33. Within this housing is confined an electrical driving motor (not shown).

The bearing sleeve 28 is likewise adapted for clamping engagement with the pintle 29 through the medium of a clamping ring 25' having integral ears 26' formed thereon and clampingly secured together by a finger screw 27'. This pintle is also slit longitudinally to increase its yieldable properties and to assure a more effective clamping relation between itself and the bearing sleeve 31.

The operation of the construction thus far described is such that the housing 32 may be adjusted in a vertical angular position with respect to the base plate 15 as well as in a horizontal angular position with respect to this base plate. This is accomplished by relieving the clamping relation between the pintle 22 and the bearing sleeve 24 when horizontal angular adjustment of the housing is desired and by relieving the clamping relation between the pintle 29 and bearing sleeve 31 when vertical angular adjustment of the housing is desired. After properly adjusting the housing in either a horizontal or vertical angular position with respect to the base plate clamping relation between the bearing sleeves of the pintles are again effected through the medium of the finger screws.

The bearing sleeves 24 and 28 have graduation marks 34 formed on certain surfaces thereof represented in angular degrees whereby one may determine the angular position of the housing in either its horizontal or vertical angular position with respect to the base plate. The bearing sleeve 31 and one of the bearing lugs 21, as indicated at 21', has guide marks 35 formed on certain surfaces thereof cooperating with the graduation marks to assist in determining the angular position of the housing.

The housing 32 includes at its rearmost end portion a handle 36 contiguous of which is disposed a trigger finger 37 of a trigger switch (not shown), confined in the housing 32. The position of this trigger finger is such that by grasping the handle 36 to move the base plate 15 over the surface of the work or over the surface of the bench, the trigger finger can be held in a position to close an electrical circuit between the motor (not shown) and a suitable source of electrical energy. The handle 36 defines a socket 38 through which circuit wires 39 are adapted to pass into the housing to be connected to the motor and the switch in any approved manner.

The specific switch construction connected in circuit with the motor has not been illustrated nor described, nor has the electrical driving motor for the sole reason that neither of these devices are included as a part of the present invention, it being pointed out that any approved motor as well as any approved switch may be incorporated as a part of the device for the purpose hereinafter set forth.

The forward wall portion 40 of the housing defines a bearing head 41 formed as an integral part of a casing 42 within which is operatively arranged a gear 43 having meshing relation with a worm gear 44. This worm gear 44 is carried by the armature shaft 45 of the motor (not shown). This armature shaft is rotatably mounted in suitable bushings 46 carried by the bearing head as best illustrated in Fig. 2. The gear 43 is carried by a shaft 47 rotatably carried by suitable bushings 48 in turn carried by bearing extensions 49 formed as an integral part of the casing 42. The exterior end portion 50 of the shaft 47 has secured thereto, as at 51, for rotation therewith a circular saw plate 52.

To prevent the hands of the operator from coming into contact with the saw blade a guard 53 is positioned to cover a part of the upper portion 53' of the saw blade. This guard includes a flange 54 which is detachably secured to one of the bearing extensions 49, as at 55, as best illustrated in Fig. 3.

The wall portion 40, as illustrated in Fig. 3, is detachably secured to the housing 32 by screw members 32'.

From the description herein it is obvious that the saw blade being operatively carried by the bearing head formed as an integral part of the wall portion 40 of the housing 32 that to adjust this saw blade in various horizontal as well as vertical annular positions, the adjustment is accomplished by adjusting the housing 32 in the manner herein set forth.

The wall portion 18 has portions therein cut away as at 18' to provide a clearance space for the saw blade when adjusted in that direction with a portion thereof operative in the arcuated space 19.

In Fig. 7 I have illustrated a modified form of construction of the base plate 15. In this construction the base plate includes aligned bearing lugs 56 formed as an integral part of the wall 19 for slidably receiving a guide rod 57 which guide rod serves to guide the saw blade when in ripping operation with respect to the work. This guide rod 57 is detachably supported by clamp members 58 each of which are detachably secured to opposite ends 59 of the bench upon which the work 60 is positioned. Each of these clamp members 58 includes a bearing sleeve 61 slidably receiving the adjacent end portion of the guide rod 57 which end portion is secured to this bearing sleeve by a set screw 62. Vertical adjustment of this bearing sleeve is permitted by a shank portion 63 which is adjustably carried by the clamp 58 and secured in the desired adjusted position through the medium of a set screw 64.

By adjusting the shank portion 63 it is manifest that the depth of the saw cut can be expeditiously governed and that this arrangement will be of great utility in cutting slits or grooves in the work. The operation of the device when including the guide rods 57 is such that the device is moved longitudinally of the guide rod and during this movement this guide rod serves to guide the saw blade during operation.

In Fig. 9 I have illustrated a combination of elements for gaging the width of the work to be cut. This combination of elements includes guide rods 65 having threaded engagement into tapped holes 66 formed in the bearing sleeves 56. These guide rods are supported by bearing sleeves 67 formed as an integral part of standards 68 which are in turn formed as an integral part of an abutment plate 69 adapted to have one of its longitudinal edges 70 in engagement with the work 60. When the guide rods 65 are connected to the bearing lugs 56 as illustrated in Fig. 7 it is manifest that the guide rod 57 is removed and conversely. The guide rods 65 are adjusted in a desired position with respect to the bearing sleeves 67 through the medium of set screws 67'.

The results of this combination of elements is such that the sleeves 67 are adjustable with the plate and the plate and the sleeves are adjustable on the rod 65 with respect to the body or base of the saw. By means of this construction the line of cut of the saw blade 52 may be controlled.

While I have illustrated the preferred form of construction of my invention, it is to be understood that various changes and alterations may be carried out in manufacture without departing from the spirit of the invention or the scope of the appended claims.

The device having been set forth, what I claim as new and useful is:

1. A device of the class described including a base plate having means thereon providing bearings, a shaft journaled in said bearings, a member including right angularly disposed bearing sleeves arranged in different planes, said shaft being journaled in one of said sleeves, another shaft journaled in the other of said sleeves, a housing having downwardly projecting lugs, said second mentioned shaft being fixed in openings provided in said lugs, a saw element and motive means therefor carried by said housing, and means for clamping said sleeves to said shafts in various angular positions with respect to said base plate.

2. A device of the class described including a base plate having means thereon providing bearings, a shaft journaled in said bearings, a member including right angularly disposed bearing sleeves arranged in different planes, said shaft being journaled in one of said sleeves, another shaft journaled in the other of said sleeves, a housing having downwardly projecting lugs, said second mentioned shaft being fixed in openings provided in said lugs, a projecting element providing bearings mounted on one end of said housing, an electric motor in said housing, said motor having an elongated shaft adapted to be mounted in bearings in said projecting element, a shaft journaled in other bearings in said housing and having a saw element thereon disposed extraneous said housing, and means for interconnecting said shaft and said motor shaft.

3. A device of the class described including a base plate having means thereon providing bearings, a shaft journaled in said bearings, a member including right angularly disposed bearing sleeves arranged in different planes, said shaft being journaled in one of said sleeves, another shaft journaled in the other of said sleeves, a housing having downwardly projecting lugs, said second mentioned shaft being fixed in openings provided in said lugs, a projecting element providing bearings mounted on one end of said housing, an electric motor in said housing, said motor having an elongated shaft adapted to be mounted in bearings in said projecting element, a shaft journaled in other bearings in said housing, a saw element on said shaft disposed extraneous said housing, means for transmitting rotation of said motor shaft to said saw carrying shaft, a handle on the opposite end of said housing, and means for adjustably clamping said sleeves to said shafts, said adjustable means being adapted to permit angular adjustment of said saw with respect to said base.

4. A device of the class described including a base plate having means thereon providing bearings, a shaft journaled in said bearings, a member including right-angularly disposed bearings, said member being journaled on said shaft, a shaft journaled in the other of said bearings, a housing having downwardly projecting lugs, said shaft being fixed in openings provided in said lugs, a saw element and motive means therefor carried by said housing and means for securing said bearings against movement to hold said saw and motive means in various angular positions with respect to said base plate.

5. A device of the class described including a base plate having means thereon providing bearings, a shaft journaled in said bearings, a member including right-angularly disposed bearings, said member being journaled on said shaft, a shaft journaled in the other of said bearings, a housing having downwardly projecting lugs, said second mentioned shaft being fixed in openings provided in said lugs, a projecting element providing bearings mounted on one end of said housing, an electric motor in said housing, said motor having an elongated shaft adapted to be mounted in bearings in said projecting element, a shaft journaled in other bearings in said element and having a saw element thereon disposed extraneous to said element, and means for interconnecting said saw shaft and said motor shaft.

6. A device of the class described including a base plate having means thereon providing bearings, a shaft journaled in said bearings, a member including right-angularly disposed bearings, said member being journaled on said shaft, another shaft journaled in the other of said bearings, a housing having downwardly projecting lugs, said second mentioned shaft being fixed in openings provided in said lugs, a projecting element providing bearings mounted on one end of said housing, an electric motor in said housing, said motor having an elongated shaft adapted to be mounted in bearings in said projecting element, a shaft journaled in other bearings in said element, a saw element on said shaft disposed extraneous to said element, means for transmitting rotation of said motor shaft to said saw carrying shaft, a handle on the opposite end of said housing and means for adjustably clamping said shafts, said means being adapted to permit angular adjustment of said saw with respect to said base.

7. In a motor-driven hand tool, a tool unit comprising a motor and a circular cutting tool supported from said motor and driven thereby, a base unit underlying said tool unit, said base unit comprising a base plate arranged to always underlie the center of gravity of said tool unit and adapted to be slidably moved over the work, and a pivotal connection between said tool unit and said base plate supporting members, said pivotal connection comprising means to permit pivotally swinging said tool unit with respect to said base along either one of two right-angularly disposed axes.

8. In a motor-driven hand tool, a tool unit comprising a motor and a circular cutting disk supported from said motor and driven thereby, a base unit arranged to always underlie the center of gravity of said tool unit, said base unit comprising a base plate adapted to be slidably moved over the work, an upstanding supporting member projecting upwardly above said base plate, a supporting member extending downwardly from said tool unit, a pivotal connection between said supporting members, said pivotal connection comprising means to permit pivotally swinging said tool unit with respect to said base along either one of two right-angularly disposed axes and means for independently locking said tool against either one of said movements.

9. In a device of the class described, a base plate adapted to be slidably moved over the work, an upwardly projecting supporting member on said base plate, a housing having a downwardly projecting supporting member, a saw element and motive means therefor carried by said housing and a universal joint connection between said supporting members, said housing and the members associated therewith being so disposed that the center of gravity thereof lies within the area of said base plate within the entire range of operation of said tool.

10. In a device of the class described, a base plate adapted to be slidably moved over the work, a supporting member extending upwardly from said base plate, a tool unit comprising a motor and a cutting disk supported and driven by said motor, a supporting member extending from said tool unit downwardly against said base plate and an adjustable connection between said supporting members comprising means to permit independently swinging said tool along two substantially right-angularly disposed pivotal axes, the weight of said tool unit being so disposed that the center of gravity thereof is always within the area of said base plate.

11. In a device of the class described, a base plate adapted to be slidably moved over the work, a supporting member extending upwardly from said base plate, a tool unit comprising a motor and a cutting disk supported and driven by said motor, a supporting member extending from said tool unit downwardly against said base plate, an adjustable connection between said supporting members comprising means to permit independently swinging said tool along two substantially right-angularly disposed pivoted axes, the weight of said tool unit being so disposed that the center of gravity thereof is always within the area of said base plate and means for independently locking said tool against either one of said swinging movements.

12. In a tool of the class described, a base plate adapted to be moved over the work, a tool unit comprising a motor and a cutting disk carried by and driven by said motor and a universal joint connection between said tool unit and said base plate, said universal joint connection comprising means to permit swinging said tool unit on an axis disposed substantially parallel to the plane of said disk and means to permit independently swinging said unit around the axis disposed in a direction perpendicular to said first mentioned axis, the center of gravity of said tool being disposed always within the area of said base plate.

13. In a tool of the class described, a base plate adapted to be moved over the work, a tool unit comprising a motor and a cutting disk carried by and driven by said motor and a universal joint connection between said tool unit and said base plate, said universal joint connection comprising means to permit swinging said tool unit on an axis disposed substantially parallel to the plane of said disk, means to permit independently swinging said unit around the axis disposed in a direction perpendicular to said first mentioned axis, the center of gravity of said tool being disposed always within the area of said base plate, and means for locking said tool against movement along one of said axes.

14. In a tool of the class described, a base plate adapted to be moved over the work, a tool unit comprising a motor and a cutting disk carried by and driven by said motor and a universal joint connection between said tool unit and said base plate, said universal joint connection comprising means to permit swinging said tool unit on an axis disposed substantially parallel to the plane of said disk, means to permit independently swinging said unit around the axis disposed in a direction perpendicular to said first mentioned axis, the center of gravity of said tool being disposed always within the area of said base plate, and means for selectively locking said tool unit against movement around either one of said axes.

In testimony whereof I affix my signature.

EDWARD F. MANTHEY.